(No Model.) 3 Sheets—Sheet 2.

O. B. SHALLENBERGER.
INDICATING WATT METER FOR ALTERNATING ELECTRIC CURRENTS.

No. 531,868. Patented Jan. 1, 1895.

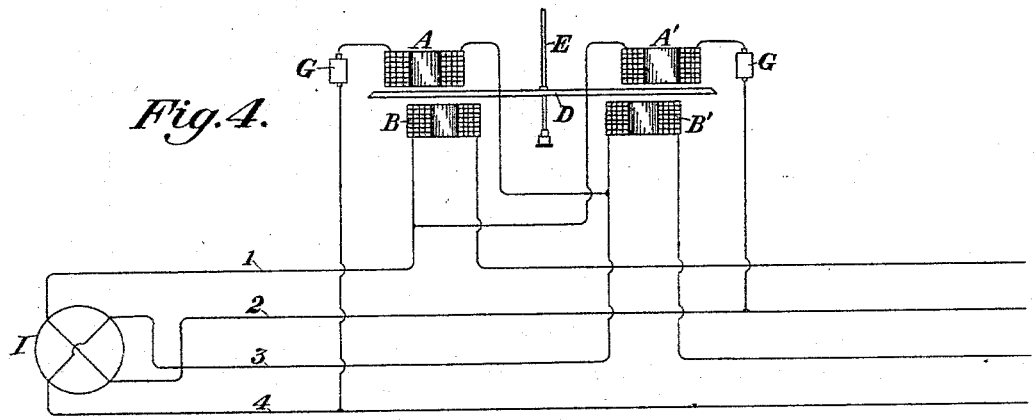
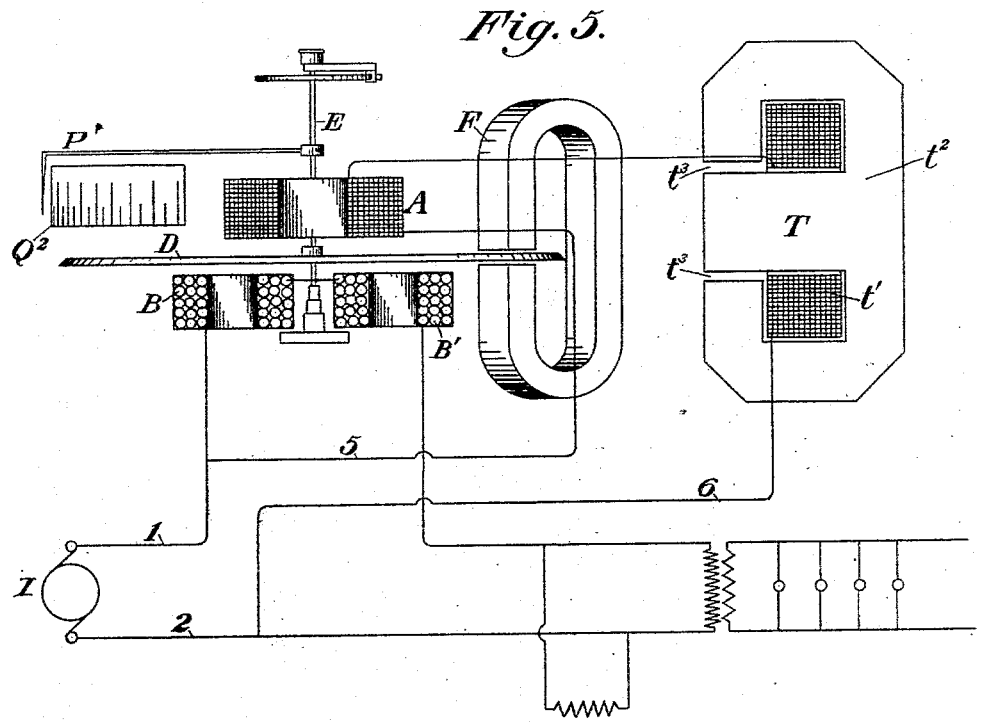

UNITED STATES PATENT OFFICE.

OLIVER B. SHALLENBERGER, OF ROCHESTER, PENNSYLVANIA.

INDICATING WATT METER FOR ALTERNATING ELECTRIC CURRENTS.

SPECIFICATION forming part of Letters Patent No. 531,868, dated January 1, 1895.

Application filed September 19, 1894. Serial No. 523,517. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Indicating Watt Meters for Alternating Electric Currents, (Case No. 613,) of which the following is a specification.

This invention relates to the class of apparatus known as alternating current measuring instruments.

The object of the invention is to provide a reliable method of and means for indicating the actual energy transmitted at any given time by alternating currents.

In other applications filed by me on the 19th day of September, 1894, Serial Nos. 523,515 and 523,516, I have described and claimed certain inventions which are fundamental to the construction and operation of the apparatus herein described, and the invention herein described relates particularly to special applications involving some of the same principles.

The general plan of operation upon which the apparatus depends involves the employment of two magnetic fields developed by currents normally differing in phase, and subjecting a moving element to the resultant action of these two fields, and indicating the amount of resulting motion thus produced.

I have demonstrated by experiment that if a closed conducting circuit of suitable form, mounted so as to be free to rotate, be placed in proper inductive relation to two alternating magnetic fields of the same periodicity, a torque is produced which is proportional to the product of three elements, viz., the strength of the respective magnetic fields and approximately the sine of the phase angle existing between them. Following this principle, I have devised the form of meter herein described, and have exhibited a number of the various methods of applying it in practice.

Certain of the features of the invention are applicable to other forms of apparatus, such for instance as ampère-meters and voltmeters, the coils being properly constructed and connected for such purposes.

Figure 1:
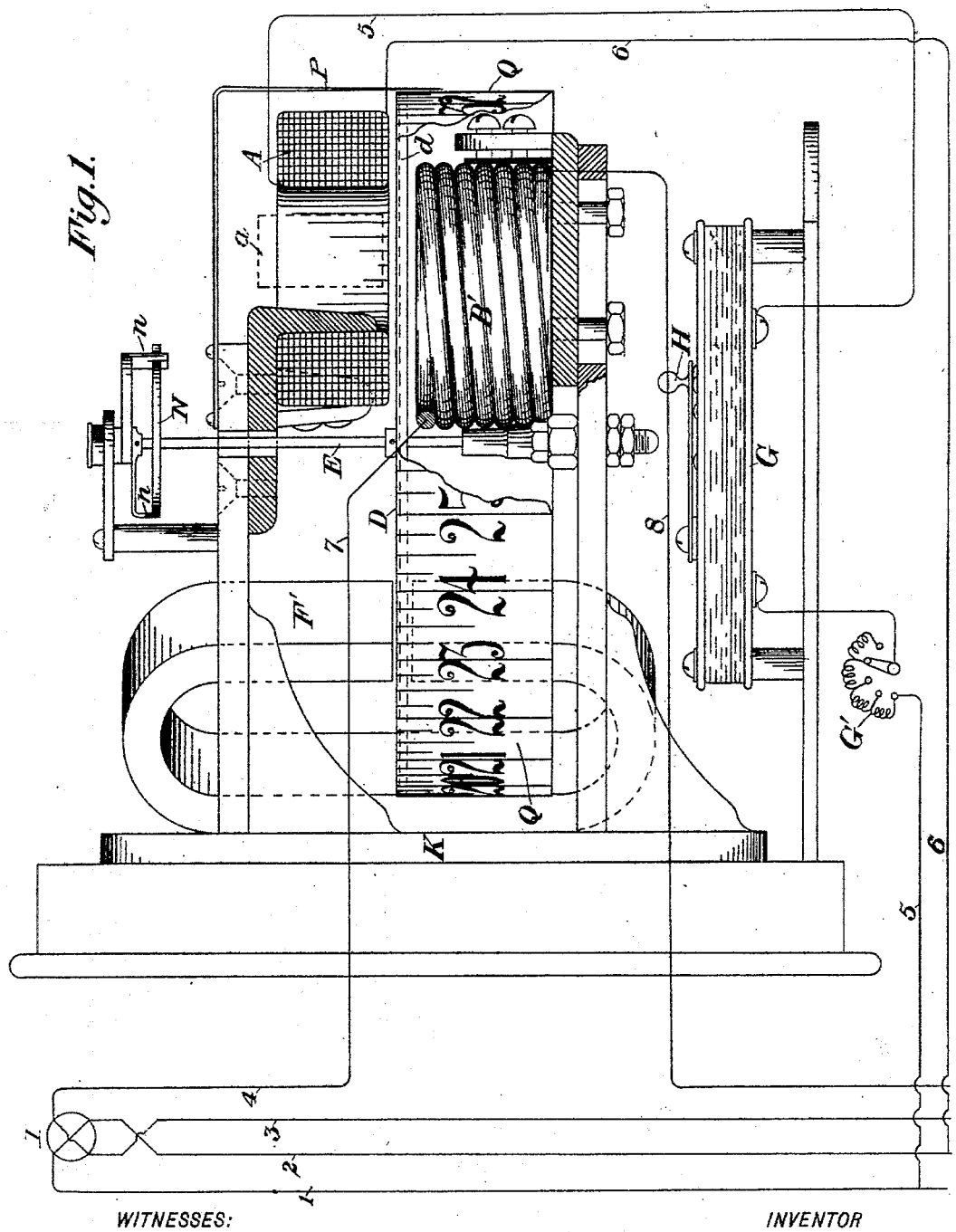
Figure 2:
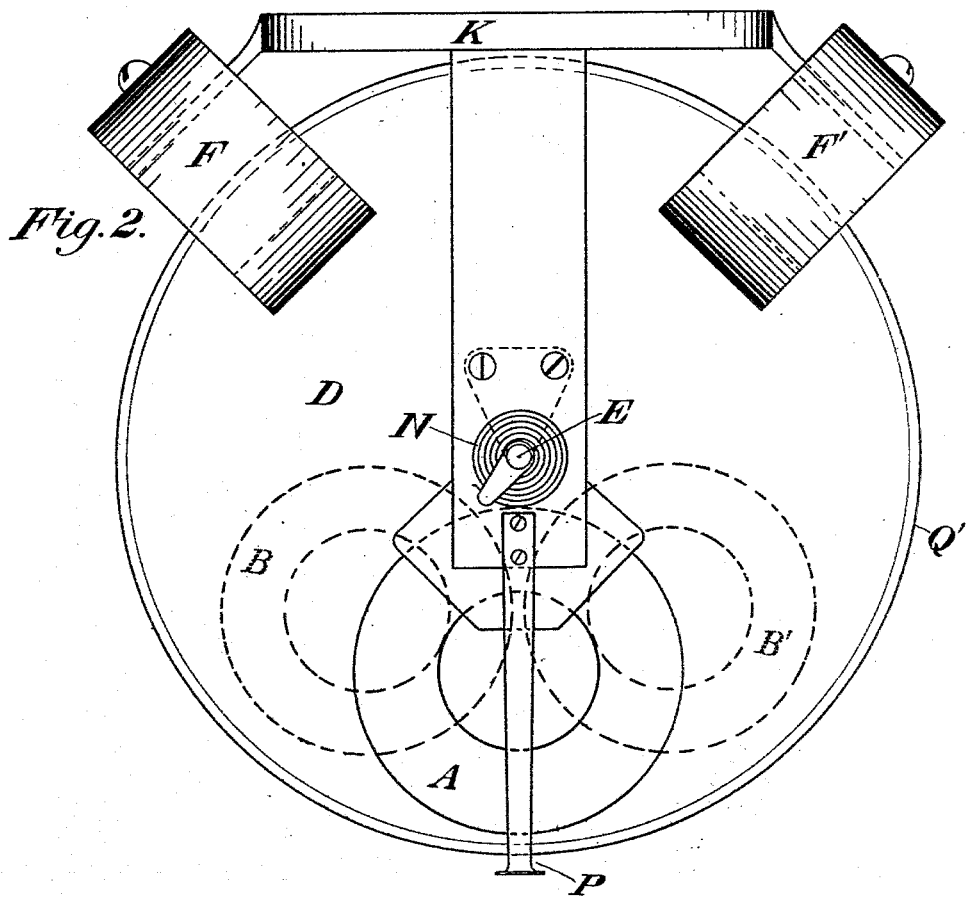
Figure 3:
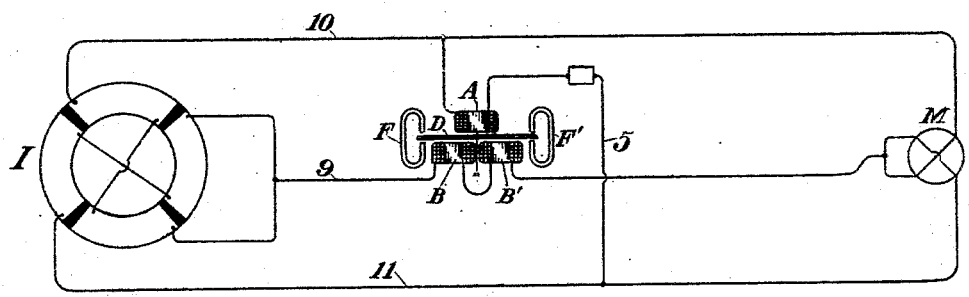

In the accompanying drawings, Figure 1 is an elevation and diagram of the circuit connections of the meter as applied to a multiphase circuit. Fig. 2 is a plan showing the details of the construction of the meter. Fig. 3 is a diagram illustrating an application of the meter to a three-wire two-phase system. Fig. 4 is a diagram illustrating the application of the invention to a two phase system wherein the different branches of the system may carry loads of different amount, and an indication is given, upon one instrument, of the total energy. Fig. 5 illustrates partly in diagram the application of the invention to a single phase system.

I will first describe the construction and operation of the meter when employed with and directly connected in circuits carrying two phase currents differing by a quarter period and transmitted over four wires, and will subsequently explain some of the modifications found useful under other conditions.

The forms of the several parts of the apparatus and their arrangement may be varied to a considerable extent.

Referring to Figs. 1 and 2 of the drawings, the circuits 1, 2, and 3, 4, lead from a two phase generator I to a work circuit containing motors or other translating devices. An inducing coil A is connected in shunt by means of wires 5, 6, to the circuit 1, 2. A second inducing coil or pair of coils B, B', is connected in series in the work circuit 3, 4, by means of the loop 7, 8.

The various parts of the meter are supported by a frame K in any convenient manner. It is desirable that the coils A and B, B', should be adjustable in position with reference to each other. These coils are so located that the magnetic axis of the coil A is approximately midway between the axes of the two coils B, B'.

Between the coils A and B, B', there is placed an armature D which is mounted upon a shaft E and is free to rotate. The armature D may be a disk of thin aluminum, copper or other conducting metal. I have found that almost any metal of reasonably high conductivity is suitable for the construction of this disk, but aluminum has certain advantages on account of its high conductivity relatively to its weight, so that the disk may be made sufficiently rigid without introducing excessive friction and without liability of injury to the bearings. In order to increase its rigidity, the edge of the disk may be turned over slightly, as shown at $d$, or it may be otherwise corrugated or ribbed, by which means the vibration due to the alternating current is suppressed. The shaft E turns in suitable bearings, and is provided with any suitable form of indicating device, as will be presently described.

A non-inductive resistance coil G is connected in series with the shunt coil A and is provided with a switch arm or equivalent device H for including more or less of its length in circuit, as may be found necessary.

The rotation of the shaft E is opposed by a spiral spring N, one end of which is attached to the shaft and the other end to an adjustable support $n$. Suitable damping magnets F, F', have their poles presented to opposite sides of the disk D in such a relation as to produce eddy currents therein when the disk is rotated. These magnets have no effect on the indication of the instrument except that of damping the oscillation and bringing the moving parts promptly to rest.

A scale Q is attached to the edge of the disk D and moves therewith. This scale is properly graduated and by its movement past an index P, the amount of deflection of the disk may be observed.

It is important to so locate the coil A with reference to the coils B, B', that the currents induced in the disk D by the coil A shall be within the magnetic field of the coils B, B', and vice versa. I have found, however, that the relative positions of the coils may be varied considerably without seriously affecting the operation of the meter. It is not necessary to employ three coils, as one coil, B or B' alone, may be used in connection with the coil A. I have found, however, that the arrangement shown in Figs. 1 and 2 is convenient and successful in practice.

In order to obtain the proper phase relation between the currents in the two circuits or sets of coils in the meter, when connected as shown in Fig. 1, the shunt-connected coil and the resistance coil in series with it, should contain as little self-induction as possible, so that its current will be in phase with the electromotive force impressed upon it, and therefore in quadrature to the electromotive force impressed upon the circuit including the coils B, B'.

The current for either or both of the circuits in the meter may be supplied either directly or by means of transformers of known ratio, attention being paid to the proportions so that the phase relations will not be practically disturbed through the range of working.

It is well known that the energy transmitted by an alternating current is equal to the product of the current, the impressed electromotive force and a factor depending upon the difference of phase between them. This factor is commonly called the power factor and when the waves are sinusoidal it is equal to the cosine of the angle representing the difference of phase.

For simplicity in treatment and explanation, I here describe the action of the apparatus in the ordinary terms employed in connection with sinusoidal waves, but do not wish to be understood as in any way limiting the usefulness of my invention or accuracy of the apparatus described to the measurement of currents of any particular wave form.

In Watt meters of ordinary construction it is customary to connect one set of coils in series with the work circuit, and an armature carrying another set of coils in shunt to the same circuit through a suitable resistance, the deflection being then proportional to the power transmitted, and a maximum when the shunt and series currents are in the same phase. I have reversed the usual conditions as to the phase relation between the currents in the shunt and series coils, and in the meter herein described the torque is zero when the two currents are in the same phase, and is a maximum when the currents are a quarter period apart. This being the case, I connect the shunt coil in a circuit so organized that the current in it differs in phase a quarter period from the impressed electromotive force in the series circuit, and is proportional in amount to that electromotive force, under which conditions a maximum indication is given when there is no lag in the work circuit, the shunt and series currents being then a quarter period apart. If, now, the work current is caused to lag from this normal relation, by the presence of an inductive load, the shunt and series currents approach each other in phase giving a diminishing indication of the meter, and if the lag amounts to a quarter wave length, so that no work is being done in the circuit, the series current is in phase with the shunt current and no rotation is produced. The torque for any given current and electromotive force is, in fact, proportional to the sine of the angle representing the displacement of phase between the currents in the shunt and series coils, which under the conditions here stated is equal to the cosine of the lag angle in the work circuit. Since the torque is also directly proportional to the product of the currents in the shunt and series coils, it is directly proportional to the power transmitted, and the opposing force being proportional to the movement, the indication is also proportional to the power transmitted.

If the same meter is intended to be used for measuring currents of different periodicities, the resistance of the shunt circuit may be varied by the adjustable rheostat G, the sections of which are marked to correspond with the periodicities required. In this way, a direct reading meter may be made suitable for the whole range of periodicities in ordinary use, say from twenty-five to one hundred and thirty-three periods per second, by introducing the proper resistance into the shunt circuit. Other means may be employed for the proper adjustment of the constant of the meter, such, for instance, as changing the position of the coils with reference to the disk, or varying their effect by introducing iron cores as indicated, for instance, in Fig. 1 at $a$ by dotted lines, or by varying the opposing force; or the meter may be adjusted for a fixed periodicity and a suitable coefficient applied to the readings dependent upon the conditions when used. The last named method is, however, somewhat inconvenient in practice. The indications of the scale may be directly in kilowatts or horse power or in other convenient units. If the power transmitted by each of two currents in quadrature is the same or proportional, a single meter connected as shown in Fig. 1 may be used with sufficiently accurate results for all ordinary purposes. If, however, there is for any reason an inequality, a meter may be placed in a similar manner on each circuit.

Since the torque is proportial to the power transmitted, it is necessary to oppose the motion of the movable element by a force proportional to the angle of deflection in order to obtain a deflection directly proportional to the energy transmitted. I have found that by the use of a spiral spring N, such as is used in the movement of marine clocks, as the opposing force, the deflection is very nearly proportional to the energy over a wide range.

Any other suitable form of spring may be used instead of the flat spiral spring shown, and if it is not important that the deflection be exactly proportional to the energy, the force of gravity may be substituted or used in connection with springs. The scale in this case should be graduated to correspond with the deflections by trial.

This instrument has the advantage of being capable of a very large angular motion without disturbing the proportionality of its deflections, and may easily be arranged to turn through three hundred and sixty degrees, or more, if desired. It is thus possible to use a very long scale so that the indication may be read with great accuracy.

Certain advantages are secured by mounting the instrument as shown in Fig. 1 with the shaft vertical, but it may be mounted horizontally, and upon knife edges if desired, in a manner well understood.

In order to utilize to the fullest extent the large angular deflection of which the meter is capable, I have found it of advantage to employ the arrangement of scale shown in Fig. 1, so that the indications may be easily read from a given point of view. This scale may be of paper or other suitable material such as aluminum, celluloid, or any material sufficiently rigid in proportion to its weight. In some cases, it is desirable to place the scale divisions directly upon the disk as indicated at Q' in Fig. 2, or the scale and disk may be formed of a single piece of metal. The form of the scale should be adapted to suit the requirements or particular construction of the instrument.

Slight variations due to changes of temperature are apt to occur in the indications of the instrument. These variations may be compensated for by means of the adjustable resistance G', Fig. 1, connected in series with the shunt coil A, and in most cases also in series with the adjustable resistance G, and may be graduated to correspond with certain definite changes of temperature.

In Fig. 3 is shown a convenient and practicable method of connecting the meter with a three-wire distribution circuit carrying two phase currents. In this figure, the source of the two phase currents is illustrated at I, which may be any suitable device such as one or more transformers or the armature of a generator.

The currents supplied to a motor or other device suitable for two phase currents at M may be assumed as practically equal, and the impressed electromotive forces of the two branches are also nearly equal, or proportional, in practice. The ordinary variations from exact equality, due to slight differences in the windings of the devices in the work circuit, affect the accuracy of the meter to a very small degree, so that the energy supplied to any device, not radically defective, is correctly measured. The conductor 9 is the conductor which is common to both circuits 9, 10, and 9, 11, and carries a resultant current differing in phase forty-five degrees from the component currents in the circuits 9, 10, and 9, 11. The resultant impressed electromotive force upon the conductor 9 through the combined circuits 10, 11, also differs forty-five degrees in phase from the electromotive forces impressed upon the circuits 9, 10, and 9, 11. The coils B, B', are connected in series with the conductor 9, directly as shown, or inductively if desired.

In order to impress upon the circuit 5, including the shunt coil, an electromotive force in quadrature with the resultant electromotive force impressed upon the conductor 9, the circuit 5 is connected across the conductors 10, 11, either directly or inductively. The maximum electromotive force upon the conductor 9 occurs when the electromotive forces of the circuits 9, 10 and 9, 11 are equal, at which time they are opposite with respect to the circuit 5 across the conductors 10, 11, so that the resultant electromotive force in circuit 5 is zero at this instant; that is to say, the electromotive forces impressed upon the two circuits containing the coils A and the coils B, B', respectively, are in quadrature. Under these conditions, the meter will register the true energy delivered, if the constant is properly adjusted to the conditions under which it is used. A similar method of connection may be adopted for three phase, and other multiphase circuits.

A single meter may also be used by combining in it the effects of the currents in the two circuits, as will be readily understood by reference to Fig. 4. In this arrangement, there are two distinct sets of coils A, B and A', B'. The coil B is connected in series in the circuit 1, 2, and the coil A in shunt to the circuit 3, 4, upon which the impressed electromotive force is in quadrature to that upon 1, 2, in the organization shown. These electromotive forces are practically equal under usual conditions. The coils A and B produce a torque therefore proportional to the energy transmitted over the circuit 1, 2, independently of the coils A', B'. In a like manner the coils A', B', produce a torque proportional to the energy transmitted over the circuit 3, 4. The combined effect upon the armature is therefore equal to the sum of two separate actions, producing a torque, and consequently an indication, proportional to the whole energy transmitted. It is important that the coils A and A' be so located that no torque is produced by currents of different phase in them alone, and also that the coils B and B' be so located that they alone produce no torque, since such action would vary as the product of the currents in the coils A, A', and not in proportion to the energy transmitted, which is equal to the sum of that transmitted over the respective circuits.

The arrangement shown in Fig. 4 is diagrammatic and intended merely to illustrate this organization of the meter. The form and arrangement of the parts may be varied in many ways, and the same arrangement of the meter may be used to measure the energy transmitted over any two circuits, separate or concatenated and of any phase relation, by suitable attention to the methods of connection shown in the various drawings.

In Fig. 5 I have illustrated a method of applying the invention to a single phase system of distribution. The series coils B, B', are connected in the circuit 1, 2. The shunt coil A is connected by the conductors 5, 6, across the circuit 1, 2. For the purpose of obtaining the required phase relation, there is inserted in the conductor 5 an inductance coil T adapted to cause the current in the circuit 5, 6, to lag approximately ninety degrees behind the impressed electromotive force. This coil comprises a winding $t'$ and a laminated core $t^2$ having one or more suitably proportioned air gaps, $t^3$.

The theory of operation of the inductance coil T is fully set forth in my application, Serial No. 523,516, hereinbefore referred to, and it will not be necessary to here repeat it in full, but it may be generally stated that by suitably proportioning the amount of iron, constituting an interrupted magnetic core, to the width of interruption or air gap and to the winding employed, a lag of approximately ninety degrees in the current behind the impressed electromotive force may be obtained. Such an inductance coil properly proportioned will also compensate for changes of periodicity so that the inductive effect of the shunt current upon the armature will be proportional to the electromotive force independently of the periodicities over a wide range. Such a coil should be so designed that the cross-section of the iron is sufficient to remain well below magnetic saturation, the interruption or air gap in the core being sufficient to require a magnetizing force which is large relatively to that required for magnetizing the iron alone, but the iron portion of the core should occupy a sufficient length of the magnetic circuit to secure a high coefficient of self-induction with relatively very small loss due to the winding.

In Fig. 5 I have shown a form of indicating device different from that shown in Figs. 1 and 2, although it will be understood that either may be employed. In this instance, the scale $Q^2$ is fixed, and the index P' is fastened to the shaft and moves over the scale in the usual way.

I claim as my invention—

1. The combination of a disk of conducting material, a shaft carrying the same, a spring opposing the rotation of the disk, means for producing two magnetic fields differing in phase, the axes of which fields traverse said disk at points so located that the two fields combine to form a resulting shifting field for rotating said disk, an index for noting the degree of rotation produced and a damping device applied to said disk.

2. In an electric indicating device for alternating currents, the combination of a disk of conducting material, a shaft carrying the same, a solenoid having its axis approximately perpendicular to the plane of the disk, a second solenoid or set of solenoids having their axes directed toward said disk at another point or points than the first, a spring for opposing the motion produced in said disk by the action of said solenoids and an indicating device for noting the position of said disk.

3. In a meter for alternating currents, an actuating device consisting of a rotary disk of conducting material, a shunt connected coil upon one side of said disk, a series connected coil upon the opposite side of said disk, said coils having their axes perpendicular to said disk and occupying different circumferential positions, and a scale carried by said disk for indicating the degree of deflection.

4. In a meter for alternating electric currents, the combination of a rotating disk, a spring or equivalent device opposing the rotation of the disk, a shunt connected coil and a series connected coil having their axes directed toward said disk at different points for producing rotation of the disk by means of currents differing in phase, a scale for noting the deflections of the disk, and a damping device for opposing the oscillations of the disk.

5. In a meter for alternating electric currents, the combination of a series connected coil, a shunt connected coil of relatively large number of turns, a device in series with the shunt connected coil compensating for variations in periodicity, an armature moved by the inductive effects of said coils, means for opposing the movement of the armature increasing in its effect in proportion to its deflection, and a scale for noting the amount of its deflection.

6. In a meter for alternating electric currents, the combination of a series connected coil, a shunt connected coil having a relatively large number of turns, and an adjustable resistance connected in series with the last-named coil for adjusting for periodicity and temperature, an armature moved by the resultant effect produced thereon by said coils and an indicating device for noting the amount of the movement of such armature.

7. In a deflecting indicating meter, the combination of a movable scale responding to variations in the energy to be indicated, and a damping device for suppressing the oscillations thereof, comprising one or more magnets and a closed conductor passing between the poles thereof and moving with the scale.

8. In a meter for indicating multiphase alternating electric currents, the combination of a coil connected across one of the circuits, a second coil connected in series with a second circuit, an armature consisting of a rotary disk toward different points of which said coils are directed, a scale and pointer for indicating the amount of deflection of said armature and a damping device for suppressing oscillations of said armature.

9. The combination with the circuits of a multiphase system of distribution by alternating currents, of a meter containing two actuating coils of which one is traversed by currents due to the resultant of two component currents differing in phase, and the other is traversed by currents due to the algebraic sum of the electromotive forces producing those component currents, an armature actuated by the resultant effects of said coils, a spring opposing the motion of the armature, and an indicating device for noting the position of the armature.

10. In an indicating meter, the combination of an armature, actuating coils for producing rotation thereof, a scale moving with said armature and a damping device for suppressing oscillations of the moving parts.

11. In an indicating meter, the combination of a disk of conducting material, actuating coils for producing rotation thereof, a damping device for suppressing oscillations of said disk and a graduated cylindrical band carried by the disk.

12. In an indicating meter, the combination of a disk of conducting material, actuating coils for producing rotation thereof, a damping device for suppressing oscillations of said disk, a graduated cylindrical band carried by the disk, and an index extending over said band.

13. An indicating meter for alternating electric currents comprising an armature, a shunt-connected coil, and a series-connected coil for actuating the same, the shunt-connected coil being traversed by currents differing in phase approximately ninety degrees from the current traversing the series-connected coil when no lag exists in the current traversing the work circuit, a spring or equivalent device for opposing the motion of the armature, and an indicating device for noting the deflection of the armature.

14. In an electric indicating meter, the combination of a movable scale for indicating the degree of deflection, a support therefor of conducting material carrying the scale, and damping magnets acting upon said conducting support.

15. In an electric indicating meter, the combination of a moving scale, a damping conductor mechanically connected therewith, and magnets between the poles of which said damping conductor moves.

16. In an electric indicating meter, the combination of a moving scale and a damping device mechanically connected therewith to oppose the oscillation of the scale.

In testimony whereof I have hereunto subscribed my name this 18th day of September, A. D. 1894.

OLIVER B. SHALLENBERGER.

Witnesses:
WESLEY G. CARR,
JAMES WM. SMITH.